UNITED STATES PATENT OFFICE.

JACQUES WITTLIN, OF VIENNA, AUSTRIA-HUNGARY, ASSIGNOR OF ONE-HALF TO SIEGFRIED SCHLEWINGER, OF NEW YORK, N. Y.

ANTISEPTIC.

1,044,840.

Specification of Letters Patent. Patented Nov. 19, 1912.

No Drawing.

Application filed January 12, 1911. Serial No. 602,155.

*To all whom it may concern:*

Be it known that I, JACQUES WITTLIN, a subject of the Emperor of Austria-Hungary, and a resident of Vienna, Austria-Hungary, have invented certain Improvements in the Manufacture of Antiseptics, of which the following is a specification.

This invention relates to certain improvements in the manufacture of antiseptics, and more particularly in that class of antiseptics which involve the use of cresols, either alone, or with other constituents, and the object of the invention is, in part, to purify and modify the evil odor commonly possessed by crude cresols, so as to widen the field of usefulness of the antiseptics prepared therefrom, and in part, by admixture of such purified cresols with other substances, to produce a resultant compound or mixture having such augmented germicidal or disinfectant properties as are calculated to impart thereto a materially enhanced value as an antiseptic.

I have ascertained that the offensive odor of crude cresols is attributable largely to the presence of certain sulfur compounds which pass over with the cresols at the high temperatures at which such substances are separated from the tars wherein they are contained, and one part of my present invention consists in subjecting the crude cresols containing such sulfur impurities, to the action of certain reagents, such for example, as metallic oxids and superoxids, which are particularly suited for the separation or removal of such sulfur impurities, and which leave the product possessed only of the natural faint odor of pure cresols.

In carrying out this part of my invention in practice, good results may be attained by subjecting the crude cresols to the action of lime water, milk of lime or other liquid containing about ½ per cent. of calcium oxid, under the influence of heat, whereby the malodorous constituents of the cresols under treatment are caused to combine with the lime or to be taken up thereby and precipitated, leaving the cresols in a purified state possessed only of the faint odor characteristic of these bodies when in a state of comparative purity. Certain superoxids, and more particularly the iron-containing by-products used in or resulting from gas refining or purifying processes may also be employed with good results in the purification and deodorization of the crude cresols, either alone or in conjunction with the calcium oxid.

The cresols purified and deodorized according to my invention are capable of being effectively used as antiseptics throughout a much wider field than is possible in the case of ordinary crude cresols, whose strong and offensive odor greatly reduces their availability, or when desired, the cresols purified and deodorized as above described may be admixed or combined with various other substances for accentuating their germicidal or antiseptic properties, or rendering them better adapted for certain special applications. For example, the cresol purified and deodorized according to my invention may be dissolved in or admixed with about twice its weight of soap solution or emulsion, after which the addition of about 0.2 per cent. picric acid; 0.02 per cent. chlorpicrine, and 5 per cent. formalin will afford an antiseptic or disinfectant of great efficiency possessed of no irritating properties and having no offensive odor. The antiseptic thus prepared is non-explosive and much more efficacious than phenol or picric acid by reason of the operation of the chlorin in freeing or weakening the bonds of the $NO_2$ groups.

If desired about 0.01 per cent. nitrobenzol, or equivalent scenting ingredient may be incorporated in the preparation of the antiseptic. The antiseptic prepared in this manner may be readily diluted to such strength as will fit it for different uses.

Where it is desired to prepare antiseptics in this manner by the use of cresols with or without the admixture or combination of picric acid, chlorpicrine, and the like, my present invention further contemplates the incorporation of ammonium fluorid or equivalent fluorin-containing salts or fluorin compounds in the preparation of the antiseptic, whereby the germicidal or disinfectant properties thereof are very materially increased.

In carrying out this part of my invention in practice, about 0.4 per cent. of ammonium fluorid may be admixed or combined with the ingredients above enumerated with the result of very greatly augmenting the efficiency of the preparation, and if the cresol entering into the preparation be purified or deodorized as above set forth it will be evident that the product will be rendered available for a very wide range of applications.

From the above description it will be seen that the antiseptics prepared according to my invention are of comparatively simple and economical nature and are particularly well adapted for use by reason of their non-irritative and deodorized nature and of their great efficiency, and it will also be obvious from the above description that some modification may be made in their preparation without departure from the principles and spirit of the invention as set forth in the appended claims, and for this reason I do not desire to be understood as limiting myself to the precise ingredients or proportions thereof enumerated above, nor to the particular steps of the process herein set forth in carrying out my invention in practice.

Having thus described my invention, what I claim and desire to secure by Letters Patent is—

1. The herein described improved process of producing antiseptics which consists in subjecting crude cresol to the action of a substance operable by precipitation to separate from such cresol sulfur impurities therein present and admixing the purified cresol with picric acid, chloropicrine, formalin, a soap solution and a fluorin compound operable to augment the germicidal action.

2. The herein described improved process of producing antiseptics which comprises admixing cresol and a fluorin compound operable to augment the germicidal action.

3. The herein described improved process of producing antiseptics which comprises admixing cresol with about 0.4 per cent. of ammonium fluorid, whereby the germicidal action of the composition is augmented.

In witness whereof I have hereunto signed my name this 17th day of December 1910, in the presence of two subscribing witnesses.

JACQUES WITTLIN.

Witnesses:
ADA MARIA BERGER,
AUGUST FUGGER.

Copies of this patent may be obtained for five cents each, by addressing the "Commissioner of Patents, Washington, D. C."

---

It is hereby certified that the name of the assignee in Letters Patent No. 1,044,840, granted November 19, 1912, upon the application of Jacques Wittlin, of Vienna, Austria-Hungary, for an improvement in "Antiseptics," was erroneously written and printed as "Siegfried Schlewinger," whereas it should have been written and printed *Siegfried Schlesinger;* and that the said Letters Patent should be read with this correction therein that the same may conform to the record of the case in the Patent Office.

Signed and sealed this 31st day of December, A. D., 1912.

[SEAL.]

C. C. BILLINGS,

*Acting Commissioner of Patents.* deodorized as above set forth it will be evident that the product will be rendered available for a very wide range of applications.

From the above description it will be seen that the antiseptics prepared according to my invention are of comparatively simple and economical nature and are particularly well adapted for use by reason of their non-irritative and deodorized nature and of their great efficiency, and it will also be obvious from the above description that some modification may be made in their preparation without departure from the principles and spirit of the invention as set forth in the appended claims, and for this reason I do not desire to be understood as limiting myself to the precise ingredients or proportions thereof enumerated above, nor to the particular steps of the process herein set forth in carrying out my invention in practice.

Having thus described my invention, what I claim and desire to secure by Letters Patent is—

1. The herein described improved process of producing antiseptics which consists in subjecting crude cresol to the action of a substance operable by precipitation to separate from such cresol sulfur impurities therein present and admixing the purified cresol with picric acid, chloropicrine, formalin, a soap solution and a fluorin compound operable to augment the germicidal action.

2. The herein described improved process of producing antiseptics which comprises admixing cresol and a fluorin compound operable to augment the germicidal action.

3. The herein described improved process of producing antiseptics which comprises admixing cresol with about 0.4 per cent. of ammonium fluorid, whereby the germicidal action of the composition is augmented.

In witness whereof I have hereunto signed my name this 17th day of December 1910, in the presence of two subscribing witnesses.

JACQUES WITTLIN.

Witnesses:
ADA MARIA BERGER,
AUGUST FUGGER.

Copies of this patent may be obtained for five cents each, by addressing the "Commissioner of Patents, Washington, D. C."

---

It is hereby certified that the name of the assignee in Letters Patent No. 1,044,840, granted November 19, 1912, upon the application of Jacques Wittlin, of Vienna, Austria-Hungary, for an improvement in "Antiseptics," was erroneously written and printed as "Siegfried Schlewinger," whereas it should have been written and printed *Siegfried Schlesinger;* and that the said Letters Patent should be read with this correction therein that the same may conform to the record of the case in the Patent Office.

Signed and sealed this 31st day of December, A. D., 1912.

[SEAL.]

C. C. BILLINGS,
*Acting Commissioner of Patents.*

Correction in Letters Patent No. 1,044,840.

It is hereby certified that the name of the assignee in Letters Patent No. 1,044,840, granted November 19, 1912, upon the application of Jacques Wittlin, of Vienna, Austria-Hungary, for an improvement in "Antiseptics," was erroneously written and printed as "Siegfried Schlewinger," whereas it should have been written and printed *Siegfried Schlesinger;* and that the said Letters Patent should be read with this correction therein that the same may conform to the record of the case in the Patent Office.

Signed and sealed this 31st day of December, A. D., 1912.

[SEAL.]

C. C. BILLINGS,
*Acting Commissioner of Patents.*